C. G. BRATTLEAF.
EMERGENCY BRAKE FOR AUTOMOBILES AND THE LIKE.
APPLICATION FILED AUG. 2, 1915.
1,187,248.
Patented June 13, 1916.
3 SHEETS—SHEET 1.
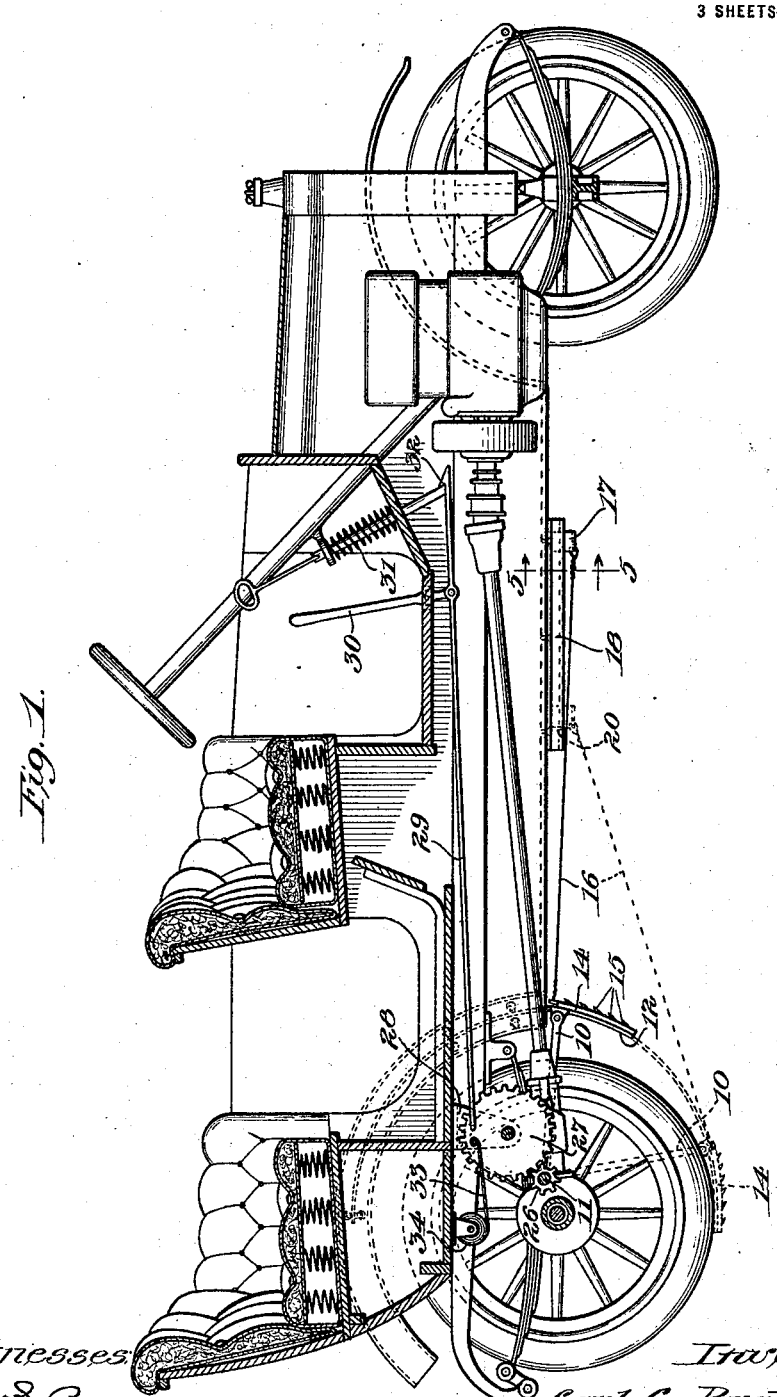

C. G. BRATTLEAF.
EMERGENCY BRAKE FOR AUTOMOBILES AND THE LIKE.
APPLICATION FILED AUG. 2, 1915.
1,187,248.
Patented June 13, 1916.
3 SHEETS—SHEET 2.
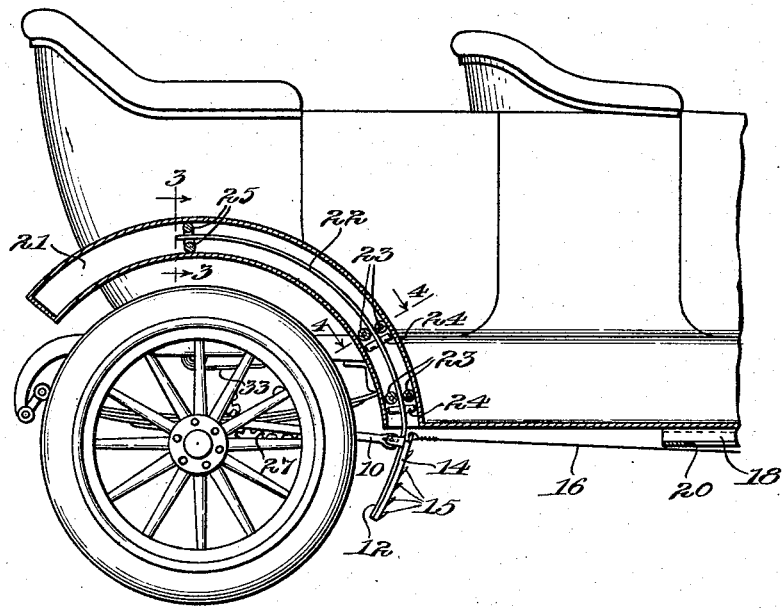
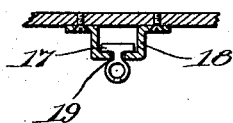
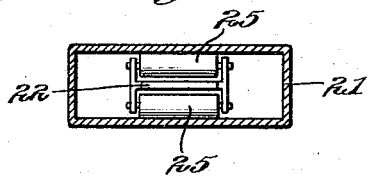 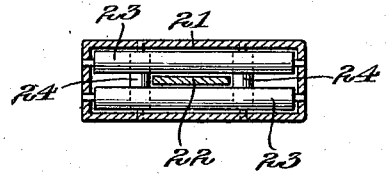
Witnesses:
H. S. Bull
B. G. Richards
Inventor,
Carl G. Brattleaf,
by Joshua R. H. Potts
his Attorney.

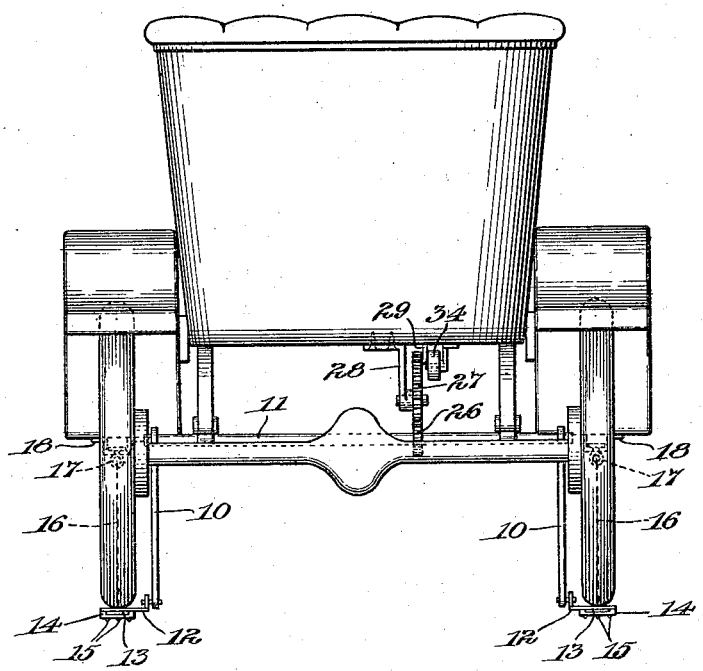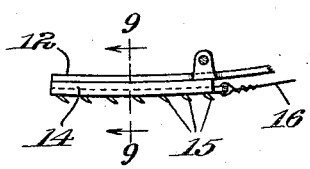

UNITED STATES PATENT OFFICE.

CARL G. BRATTLEAF, OF CHICAGO, ILLINOIS.

EMERGENCY-BRAKE FOR AUTOMOBILES AND THE LIKE.

1,187,248.  Specification of Letters Patent.  Patented June 13, 1916.

Application filed August 2, 1915.   Serial No. 43,286.

*To all whom it may concern:*

Be it known that I, CARL G. BRATTLEAF, a subject of the King of Sweden, and a resident of the city of Chicago, county of Cook, and State of Illinois, have invented certain new and useful Improvements in Emergency-Brakes for Automobiles and the like, of which the following is a specification.

My invention relates to improvements in emergency brakes for automobiles and the like, and has for its object the provision of an improved construction of this character arranged for quickly stopping the vehicle in case of emergency.

The invention consists in the combinations and arrangements of parts hereinafter described and claimed.

The invention will be best understood by reference to the accompanying drawings forming a part of this specification, and in which, Figure 1 is a longitudinal vertical section, of an automobile partially in elevation, equipped with an emergency brake mechanism embodying my invention, Fig. 2, a side view of the rear portion of said automobile with portions shown in section, Fig. 3, an enlarged section taken on line 3—3 of Fig. 2, Fig. 4, an enlarged section taken on line 4—4 of Fig. 2, Fig. 5, an enlarged section taken on line 5—5 of Fig. 1, Fig. 6, a rear view of the automobile, Fig. 7, an enlarged detail side view of one of two brake shoes employed in the construction, Fig. 8, a bottom plan view of said brake shoe, and Fig. 9, an enlarged section taken on line 9—9 of Fig. 7.

The preferred form of construction, as illustrated in the drawings, comprises two operating arms 10 mounted at the ends of a shaft 11 arranged transversely of the bottom of the automobile adjacent but a little forward of the rear axle thereof. At its free end, each of the arms 10 carries a plate 12 pivoted thereto and projecting outwardly therefrom in position to pass under the rear wheels of the automobile when placed adjacent the ground. Each of the plates 12 is provided on its bottom with a rearwardly diverging dove-tail rib 13 and a brake shoe 14 is arranged on the bottom of each of said plates, being provided with a corresponding dove-tail groove to fit the rib 13, as indicated. Each of the brake shoes 14 is provided with forwardly and downwardly projecting points 15 adapted to engage with the ground and exert great friction thereon. The outward end of each of the brake shoes 14 is connected by means of a rod 16 with a T-head 17 slidable in a channel member 18 arranged on the bottom of the forward portion of the automobile body in substantial longitudinal alinement with the corresponding shoe. Each of the guide members 18 is provided in its bottom with a slot 19 extending from its forward edge to a point 20 adjacent its rearward edge, said T-head 17 sliding freely in said slot until it encounters the end thereof at a point 20 which thus limits the rearward movement of the T-head and consequently rearward movement of the corresponding brake shoe 14.

A hollow arcuate mud guard 21 is arranged over each of the rear wheels of the automobile and an arcuate guide member 22 in the form of a bent band is attached to the upper portion of the corresponding plate 12 and slidably mounted in the corresponding mud guard 21. Each of the guide bands 22 is guided in its mud guard by means of transverse and radial guide rollers 23 and 24 and by guide rollers 25 attached to the upper end thereof and running in the corresponding mud guard.

Shaft 11 carries a centrally positioned pinion 26 meshing with a gear 27 carried by a bracket 28 secured to the bottom of the automobile body, as best illustrated in Figs. 1 and 6. A rod 29 has its rear end connected eccentrically with gear 27 and its forward end connected with the bottom of an operating lever 30 arranged adjacent the driver's seat. A spring catch 31, also arranged adjacent the driver's seat, is arranged to engage a shoulder 32 on the extreme forward end of rod 29 and lock said rod in the position indicated in Fig. 1, with the gear 27 in position to hold brake shoes 14 from contact with the ground. A flexible cable or band 33 is also eccentrically connected with gear 27 and wound upon a spring drum 34, said spring drum thus serving to normally draw the gear 27 in a direction to effect depression of the brake shoes 14 through the medium of pinion 26, as will be readily understood. By this arrangement, in case of emergency, such as skidding or failure of the ordinary brakes of the vehicle to operate effectively, the emergency brakes may be released and applied by merely operating spring catch 31 to release rod 29, whereupon spring drum 34, combined with gravity, operates to depress the brake shoes into contact with the ground under the rear wheels of the automobile, so that said rear wheels will run up onto said brake shoes, thus elevating the same from contact with the ground and forcibly pressing said brake shoes into contact therewith. This action tends to cause forcible rearward rotation of the brake shoes 14, which action is prevented by means of the rods 16 and the T-heads 17, as explained above. When it is desired to release the emergency brakes, the car is backed off of them and the same are manually elevated into inoperative positions by means of lever 30, where they are locked against operation by means of spring catch 31, as will be readily understood.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. The combination of a vehicle wheel; a brake shoe arranged to be interposed between said wheel and the ground; a hollow arcuate mud guard arranged above said wheel; and an arcuate guide connected with said shoe and slidable in said mud guard, substantially as described.

2. The combination of a vehicle wheel; an arm pivotally mounted adjacent the axis of said wheel; a brake shoe pivoted on said arm and arranged to be interposed between said wheel and the ground; a hollow arcuate mud guard arranged above said wheel; and an arcuate guide connected with said shoe and slidable in said mud guard, substantially as described.

3. The combination of a vehicle wheel; an arm pivotally mounted adjacent the axis of said wheel; a brake shoe pivoted on said arm and arranged to be interposed between said wheel and the ground; a hollow arcuate mud guard arranged above said wheel; an arcuate guide connected with said shoe and slidable in said mud guard; a spring normally holding said shoe in depressed position; manually operable means for elevating said shoe; and means for limiting the rearward movement of said shoe, substantially as described.

4. The combination of a self-propelled vehicle having a pair of rear driven wheels; a shaft mounted on said vehicle adjacent the axis of said wheels; arms on the ends of said shafts adjacent the inner sides of said wheels; brake shoes pivoted to the ends of said arms and arranged to pass under the corresponding wheels; freely slidable members mounted on the bottom of said vehicle forward of said wheels; a rod connecting each of said brake shoes with one of said members; a pinion on said shaft; a gear meshing with said pinion; a spring connected with said gear and normally holding said brake shoes in depressed positions; an operating lever; an operative connection between said lever and said gear arranged to cause elevation of said brake shoes upon manipulation of said lever; and a spring held catch arranged to lock said brake shoes in elevated positions, substantially as described.

In testimony whereof I have signed my name to this specification in the presence of two subscribing witnesses.

CARL G. BRATTLEAF.

Witnesses:
 JOSHUA R. H. POTTS,
 CORA F. SCHIEBER.

Copies of this patent may be obtained for five cents each, by addressing the "Commissioner of Patents, Washington, D. C."